(12) United States Patent
de la Borbolla et al.

(10) Patent No.: US 9,704,373 B2
(45) Date of Patent: Jul. 11, 2017

(54) SMART LUG SYSTEM

(71) Applicant: Thomas & Betts International, LLC, Wilmington, DE (US)

(72) Inventors: Ian Rubin de la Borbolla, Memphis, TN (US); Mark R. Drane, Collierville, TN (US); Cong Thanh Dinh, Collierville, TN (US); Andrew J. Feudner, Collierville, TN (US); Brian Burke, Collierville, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 89 days.

(21) Appl. No.: 14/718,209

(22) Filed: May 21, 2015

(65) Prior Publication Data

US 2015/0348394 A1    Dec. 3, 2015

Related U.S. Application Data

(60) Provisional application No. 62/004,370, filed on May 29, 2014.

(51) Int. Cl.
*G08B 1/08* (2006.01)
*G08B 21/18* (2006.01)
(Continued)

(52) U.S. Cl.
CPC ............ *G08B 21/182* (2013.01); *G01D 3/10* (2013.01); *G01D 11/16* (2013.01); *G02B 6/3895* (2013.01); *H01R 11/26* (2013.01); *H01R 13/6683* (2013.01); *H04W 4/005* (2013.01); *G08B 25/08* (2013.01); *H04L 67/12* (2013.01); *H04W 4/008* (2013.01); *H04W 4/02* (2013.01); *H04W 4/185* (2013.01); *H04W 88/08* (2013.01)

(58) Field of Classification Search
CPC .. G02B 6/3895; H01R 11/26; H01R 13/6683; G08B 21/182; H04W 88/08
USPC .................... 340/539.1, 572.1; 439/488, 489
See application file for complete search history.

(56) References Cited

U.S. PATENT DOCUMENTS

| 5,924,289 | A | 7/1999 | Bishop, II |
| 6,002,331 | A | 12/1999 | Laor |

(Continued)

FOREIGN PATENT DOCUMENTS

| GB | 2485446 A | 5/2012 |
| WO | 2005021983 A1 | 3/2005 |
| WO | 2010124665 A1 | 11/2010 |

*Primary Examiner* — John A Tweel, Jr.
(74) *Attorney, Agent, or Firm* — Taft Stettinius & Hollister LLP

(57) ABSTRACT

A device includes a device body that further includes a first attachment mechanism for attaching to another object, structure, or item of equipment. The device also includes wireless communication circuitry affixed to the device body, and one or more sensor components affixed to the device body, coupled to the wireless communication circuitry, and configured to sense environmental parameters associated with the device or with the object, structure or item of equipment. The device may further include powering circuitry, affixed to the device body, and configured to provide electrical power to the wireless communication circuitry and/or the one or more sensor components. The device may include a lug, connector or terminal.

26 Claims, 13 Drawing Sheets

(51) Int. Cl.

| | | |
|---|---|---|
| *H01R 11/26* | (2006.01) | |
| *G02B 6/38* | (2006.01) | |
| *H01R 13/66* | (2006.01) | |
| *G01D 3/10* | (2006.01) | |
| *G01D 11/16* | (2006.01) | |
| *H04W 4/00* | (2009.01) | |
| *H04W 4/02* | (2009.01) | |
| *H04W 88/08* | (2009.01) | |
| *H04L 29/08* | (2006.01) | |
| *H04W 4/18* | (2009.01) | |
| *G08B 25/08* | (2006.01) | |

(56) References Cited

U.S. PATENT DOCUMENTS

| | | |
|---|---|---|
| 6,501,382 B1 | 12/2002 | Rehfus et al. |
| 6,777,617 B2 | 8/2004 | Berglund et al. |
| 6,784,802 B1 | 8/2004 | Stanescu |
| 6,971,895 B2 | 12/2005 | Sago et al. |
| 7,306,489 B2 | 12/2007 | Werthman et al. |
| 7,446,658 B2 | 11/2008 | Panotopoulos |
| 7,471,198 B2 | 12/2008 | Yamamoto et al. |
| 7,525,430 B2 | 4/2009 | Nakamura et al. |
| 7,541,939 B2 | 6/2009 | Zadesky et al. |
| 7,965,186 B2 | 6/2011 | Downie et al. |
| 7,988,464 B2 | 8/2011 | Kossak et al. |
| 8,096,816 B2 | 1/2012 | Kossak et al. |
| 8,264,366 B2 | 9/2012 | Chamarti et al. |
| 8,308,498 B2 | 11/2012 | Adams |
| 8,333,518 B2 | 12/2012 | Jones et al. |
| 8,334,781 B2 | 12/2012 | Heck et al. |
| 8,335,936 B2 * | 12/2012 | Jonsson ............ H01R 13/6683 307/112 |
| 8,421,626 B2 | 4/2013 | Downie et al. |
| 8,552,876 B2 | 10/2013 | King, Jr. |
| 8,618,914 B2 | 12/2013 | Bachman et al. |
| 8,956,168 B2 * | 2/2015 | Al-Anzi ............ H01R 13/6683 439/159 |
| 2002/0186134 A1 | 12/2002 | Rehfus et al. |
| 2004/0117515 A1 | 6/2004 | Sago et al. |
| 2005/0208908 A1 | 9/2005 | Karschnia et al. |
| 2005/0242086 A1 | 11/2005 | Imura |
| 2005/0285735 A1 | 12/2005 | Imura et al. |
| 2006/0180371 A1 | 8/2006 | Breed et al. |
| 2008/0295330 A1 | 12/2008 | Shimirak |
| 2009/0044385 A1 | 2/2009 | Naderer et al. |
| 2012/0274452 A1 | 11/2012 | Chamarti et al. |
| 2013/0212945 A1 | 8/2013 | Lanham et al. |
| 2013/0298642 A1 | 11/2013 | Gillette, II |
| 2013/0298864 A1 | 11/2013 | Nuebel et al. |
| 2015/0247745 A1 | 9/2015 | McClogan |

* cited by examiner

SMART LUG SYSTEM

CROSS-REFERENCE TO RELATED APPLICATION

This application claims priority under 35 U.S.C. §119, based on U.S. Provisional Patent Application No. 62/004,370, filed May 29, 2014, the disclosure of which is hereby incorporated by reference herein.

BACKGROUND

Lugs, electrical connectors, terminals, and clamps (e.g., beam clamps) all include mechanisms for connecting or affixing them to another object or structure. For example, a lug may connect a length of cable to another object or structure, such as, for example, a motor. As another example, an electrical connector may crimp to a copper electrical cable at one end and have a second end that attaches to an object or structure. The objects or structures to which lugs, electrical connectors, terminals or clamps connect may undergo various environmental conditions such as high or low temperatures, high levels of vibration, excessive heat, excessive moisture, high impact forces, high compression forces, and/or high accelerations.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein affix wireless communication circuitry to lugs, electrical connectors, terminals, and clamps for reporting environmental parameters associated with their operation in conjunction with the object or structure to which those items are attached, such as a motor, an electrical cable, etc. Affixed sensor circuitry may measure temperature, moisture, vibration, heat, impact force, compression force, velocity, acceleration, and/or other environmental parameters, and those measured parameters may be transmitted as sensor reports via the wireless communication circuitry, for subsequent receipt by a central network device. The central network device may perform an analysis of the environmental parameters.

Figure 1:
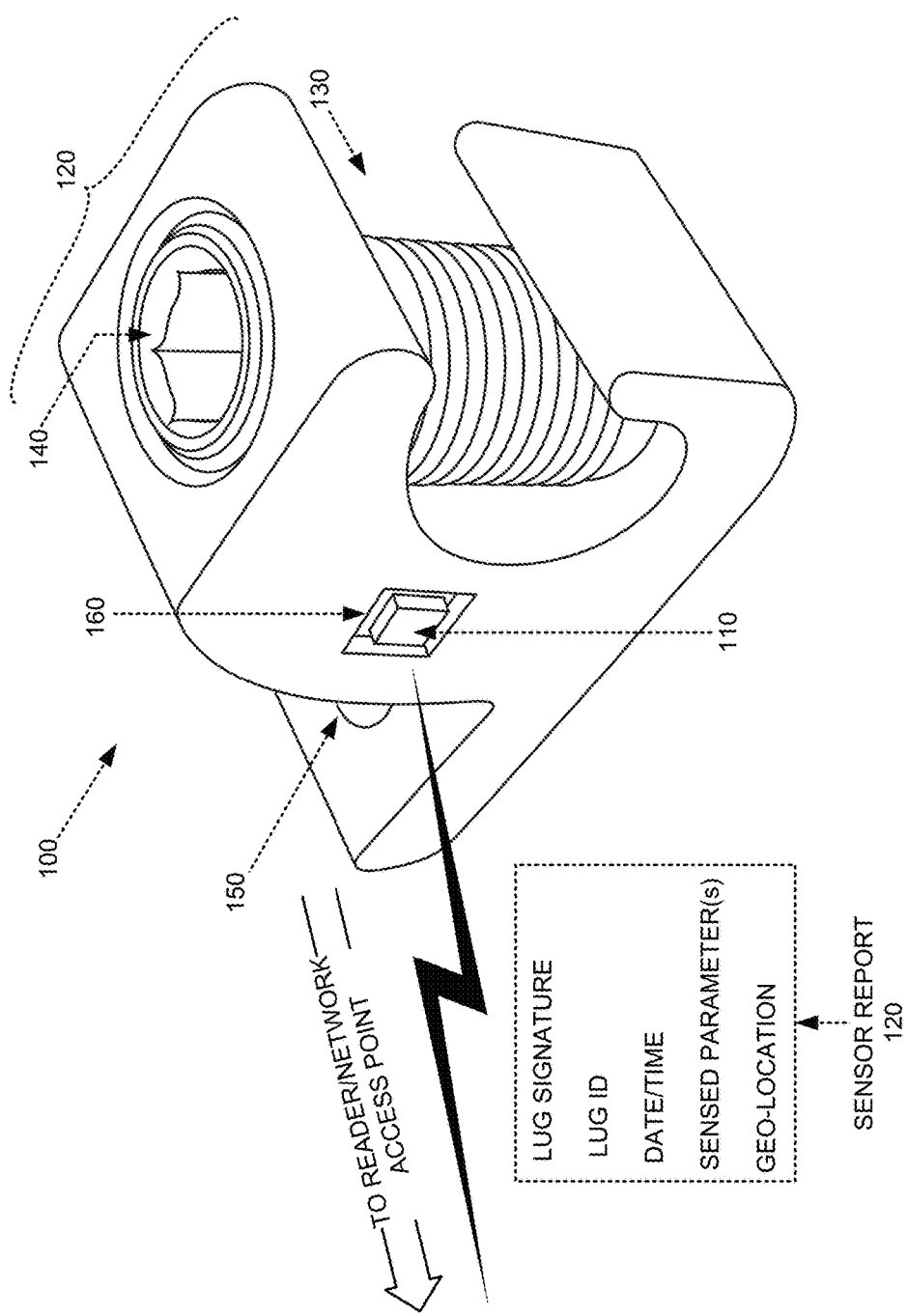
FIG. 1 illustrates an exemplary "smart" lug that includes wireless communication mechanisms according to an exemplary embodiment.

FIG. 1 illustrates an exemplary "smart" lug 100 that includes wireless communication mechanisms according to an exemplary embodiment. As depicted, lug 100 may include circuitry 110 that further includes wireless communication components for transmitting data from lug 100. Circuitry 110 may transmit data to an external reader (not shown) or to a wireless network access point (not shown) (e.g., a Wi-Fi unit connected to a network router) that further connects to a network, such as, for example, the Internet.

Lug 100 may, for example, include a lug, a terminal, a connector, a tool or a die which have circuitry 110 affixed to them in some fashion. Lug 100 may include a lug body 120 that may be formed using various different techniques and from various different types of materials. In one embodiment, for example, lug body 120 may be cast or machined from steel. Lug body 120 may include a lug cut-out 130 for receiving an inserted item, such as, for example, an inserted cable, and an attachment mechanism 140 for affixing lug body 120 to the inserted item. In one embodiment, attachment mechanism 140 may include an attachment screw which might tighten against the inserted item to affix lug body 120 to the inserted item. Lug body 120 may additionally include an attachment hole 150 for affixing lug 100 to a surface of another object or structure (e.g., a motor). Attachment hole 150 may have a certain diameter such that a bolt, screw, or similar attaching means may be inserted through the diameter of hole 150 and then tightened to affix lug 100 to the surface of the other object or structure. In one implementation, lug body 120 itself may act as an antenna for circuitry 110.

In one implementation, as depicted in FIG. 1, circuitry 110 may be affixed within an external recess 160 of lug 100. In other implementations, circuitry 110 may be affixed internally within lug 100 (e.g., in an accessible or inaccessible internal location not shown in FIG. 1). Circuitry 110 may include various different types of circuit components implemented as one or more different Integrated Circuits (ICs). In some implementations, circuitry 110, in its entirety or as sub-units of the circuitry, may be implemented as "stickers" (e.g., radio-frequency identification (RFID) sticker, temperature sticker) where the circuitry may be applied to lug 100 via a sticky undersurface. The different types of circuit components may include, for example, one or more communication interface units, one or more sensor units, a processing unit (e.g., a microprocessor), and a powering unit. The communication interface units may include one or more circuit modules for communicating via various different types of radio frequency (RF) and/or optical (e.g., infrared) mechanisms. In one implementation, circuitry 110 may instead involve a Quick Response (QR) code that may be read by an optical reader (e.g., infrared reader). The sensor units may include one or more different types of sensor modules that can sense (i.e., measure) different environmental parameters associated with lug 100 and/or the object or structure to which lug 100 is affixed. The powering unit may include a module that generates power for the components of circuitry 110. In one implementation, the powering unit may include a module that "harvests" waste energy from circuitry 110, from lug 100, or from the object or structure to which lug 100 is affixed. Exemplary components of circuitry 110 are described in further detail below.

Circuitry 110 may, for example, transmit sensor reports 120 that include various types of data. The various types of data may include, for example, a lug signature, a lug identifier (ID), a date and/or time, a sensed parameter(s), and/or a geo-location of lug 100. The lug signature may include data that constitutes a signature for the lug, or for an overall system or structure in which lug 100 is being used. The lug signature may, for example, include a hash of the lug identifier. The lug ID may include a unique identifier of lug 100. The date and/or time may identify the calendar date and/or the time (e.g., in hour, minutes and seconds) that sensed parameter(s) were measured by the sensor units of circuitry 110. The sensed parameter(s) may include one or more environmental parameters associated with lug 100, or with the object, structure, or item of equipment to which lug 100 is affixed, that are measured by the sensor unit(s) of circuitry 110. For example, the sensed parameter(s) may include, for example, temperature, moisture, vibration, heat, impact force, compression force, velocity, and/or acceleration measured by the sensor unit(s) of circuitry 110. Other types of environmental parameters may be sensed/measured by the sensor unit(s) of circuitry 110. The sensed parameter(s) may correspond to conditions of a motor, cable or other object, structure, or item of equipment to which lug 100 is affixed. The geo-location may include a geographic location (e.g., latitude and longitude) associated with the physical location of lug 100.

Figure 2:
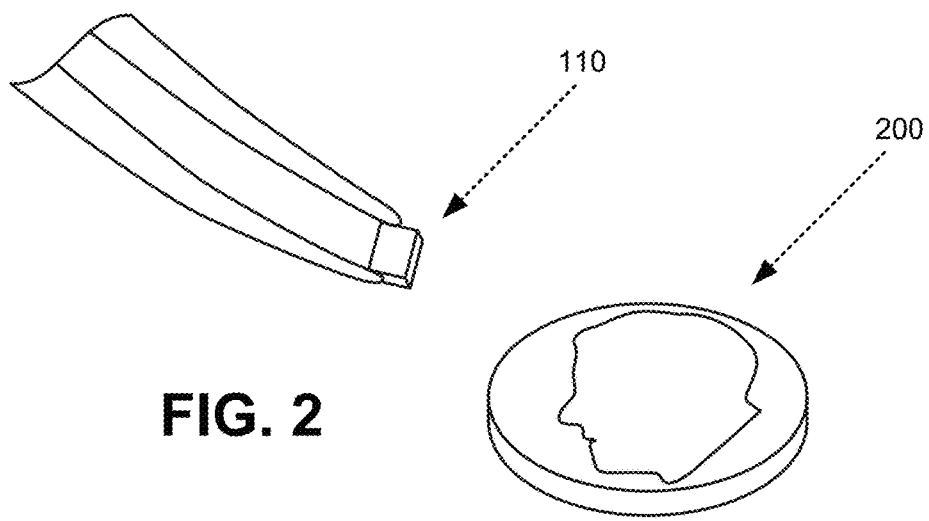
FIG. 2 depicts an example of the size of the circuitry of the lug of FIG. 1 relative to a coin.
Figure 3:
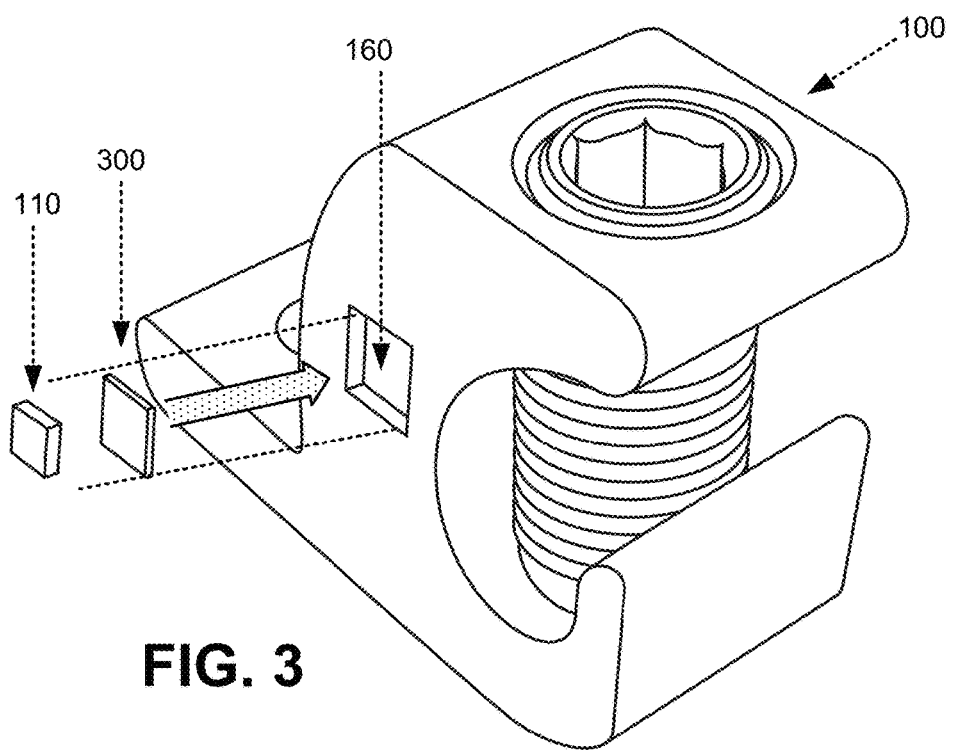
FIG. 3 illustrates one embodiment in which the circuitry of FIG. 2 is affixed to the lug via an external recess formed within an external surface of the lug.

FIG. 2 depicts an example of the size of circuitry 110 relative to another object, such as a coin 200. For example, circuitry 110 may be less than 0.125 inches in length, width and depth in some implementations. In the example of FIG. 2, circuitry 110 may include one or more very large scale integrated circuits (VLSIs). In other implementations, circuitry 110 may include one or more small-scale, medium-scale, large scale, or ultra-large-scale integrated circuits. In further implementations, circuitry 110 may include a wafer-scale integrated system, or a system-on-a-chip (SOC). FIG. 3 further shows circuitry 110 being affixed to lug 100 via external recess 160 formed within an external surface of lug 100. As depicted in FIG. 3, an insulating layer 300 may be affixed within recess 160, and circuitry 110 may further be affixed to an outer surface of insulating layer 300 within recess 160. Glue, solder, or another appropriate type of mechanism may be used for affixing insulating layer 300 within recess 160, or for affixing circuitry 110 to insulating layer 300. In further implementations, a sealing outer layer (not shown) may be formed over circuitry 110 and recess 160 to protect circuitry 110 from external contamination (e.g., water, dirt). The sealing outer layer may include, for example, an acrylic, polyurethane, an epoxy, or a silicon layer.

Figure 4A:
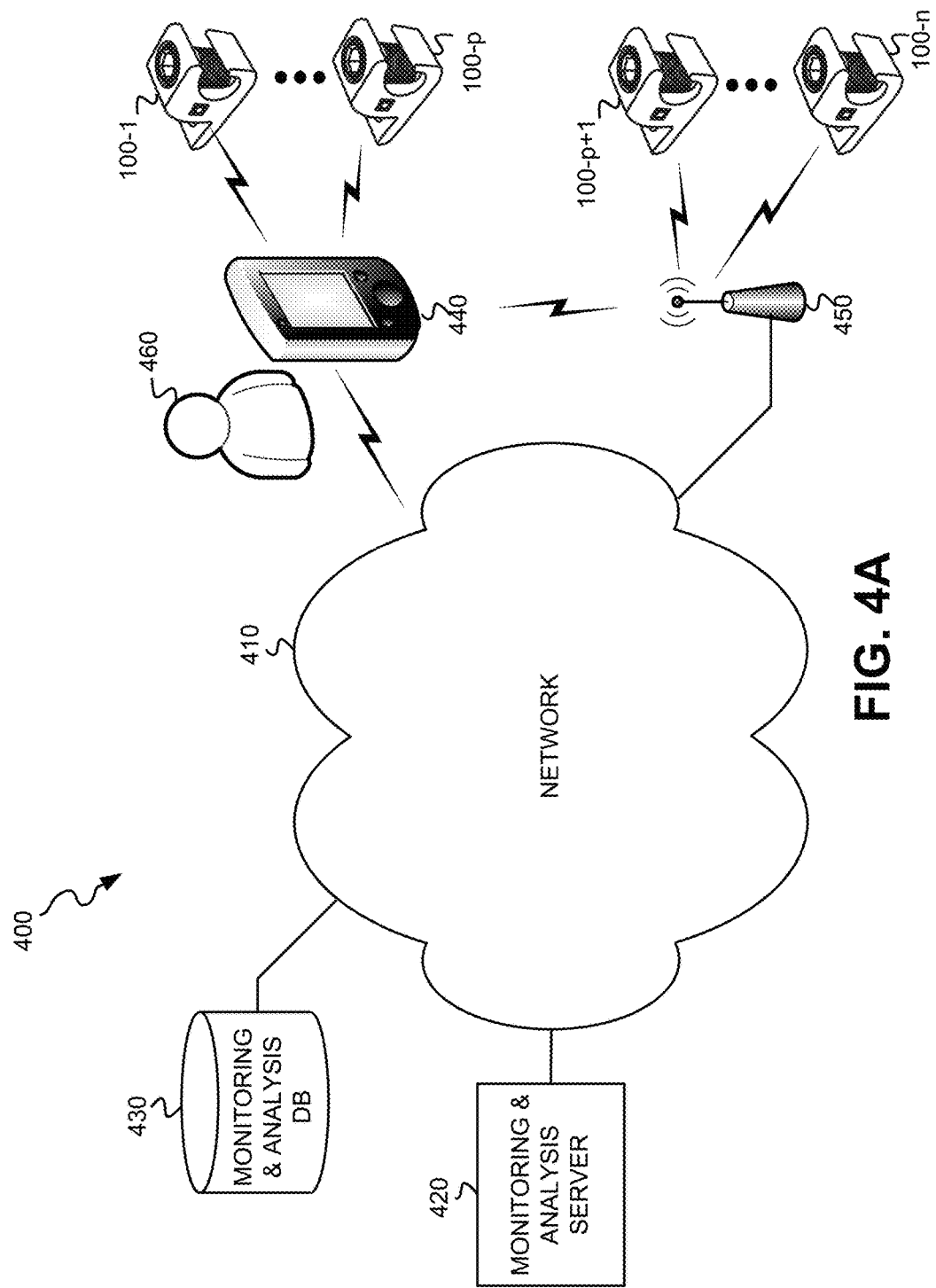
FIGS. 4A and 4B depict an exemplary network environment in which one or more lugs may be used to provide sensed parameters related to local environments associated with each of the lugs.
Figure 4B:
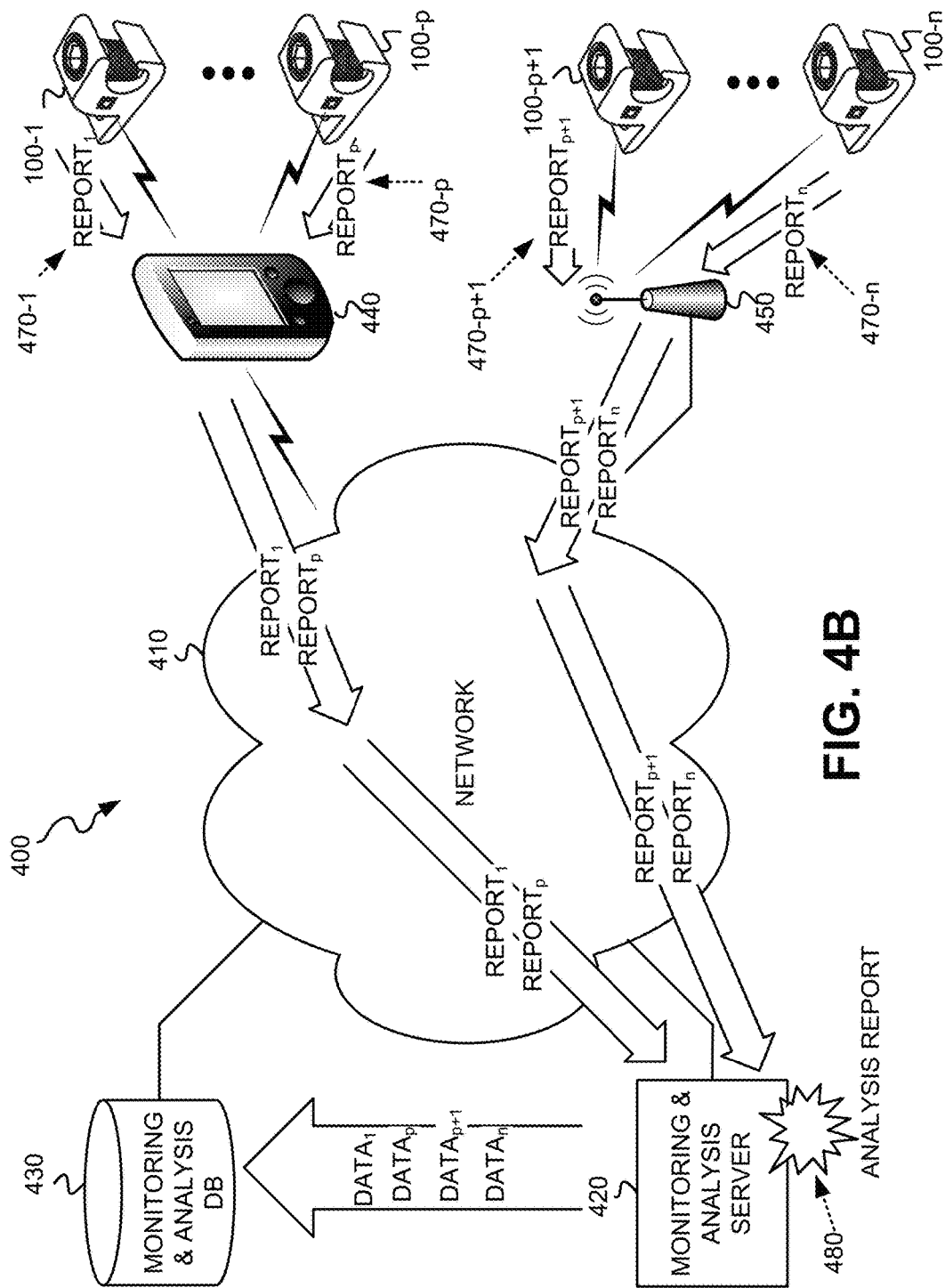

FIGS. 4A and 4B depict an exemplary network environment 400 in which one or more lugs 100 may be used to provide sensed parameters related to local environments associated with each of the lugs 100. Network environment 400 includes a network 410, a monitoring and analysis server 420, a monitoring and analysis database (DB) 430, a wireless reader 440, a wireless network access point 450, and multiple lugs 100-1 through 100-n (where n is greater than or equal to 2). As shown in FIG. 4A, multiple lugs 100-1 through 100-p may communicate with wireless reader 440, and multiple lugs 100-p+1 through 100-n may communicate with network 410 via a wireless network access point 450. Though only a single wireless reader 440 and a single wireless network access point 450 are shown in FIGS. 4A and 4B, network environment 400 may include multiple different wireless readers 440 and multiple different wireless network access points 450.

Network 410 may include one or more different types of networks including, for example, a satellite network, a Public Switched Telephone Network (PSTN), a local area network (LAN), a wide area network (WAN), a metropolitan area network (MAN), an intranet, the Internet, or a cable network (e.g., an optical cable network).

Monitoring and analysis server 420 may include one or more network devices that monitor sensor reports received via network 410, or via a direct link with wireless reader 440, extract data from the sensor reports, and store the extracted data in the appropriate files of DB 430. Server 420 may additionally use one or more analysis algorithms for analyzing the data stored in DB 430. Server 420 may us the algorithm(s) to perform the analysis(ses) on-demand or based on a schedule or a period interval. The one or more analysis algorithms may perform simple data analyses (e.g., lug temperature vs. time; or vibration vs. geo-location) and/or more sophisticated data analyses (e.g., a 3-D plot of temperature vs. geo-location vs. time)

Figure 7:
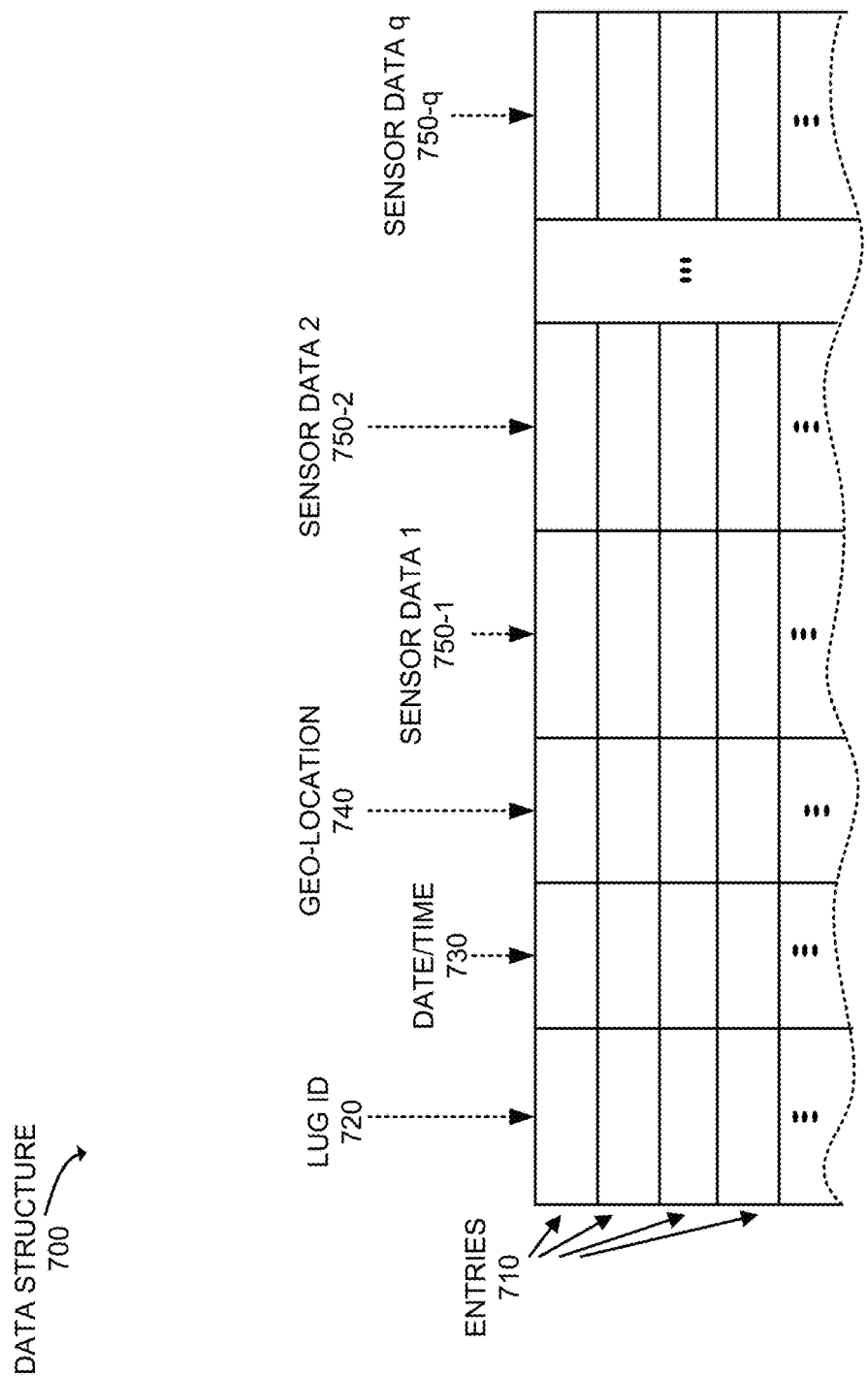
FIG. 7 depicts an exemplary data structure that may be stored in the monitoring and analysis database of FIG. 4A.

Monitoring and analysis DB 430 may include one or more network devices having memory storage capacity for storing a data structure, such as the data structure of FIG. 7. The data structure may include fields such as those shown in FIG. 7, or may include fewer, additional, or different fields than those shown in FIG. 7. DB 430 may permit data read and write requests from server 420 (and/or other devices not shown).

Wireless reader 440 may include a portable electronic device having wireless communication capabilities that may communicate with lugs 100 via direct wireless connections, and with server 420, indirectly via network 410 or via a direct connection. Wireless reader 440 may include, for example, a laptop, palmtop or tablet computer having wireless capability; a cellular telephone (e.g., a "smart" phone); a personal digital assistant (PDA) having wireless capability; or a custom purpose-built device designed to communicate with lugs 100. As shown in FIG. 4A, wireless reader 440 may be operated by a user 460. User 460 may query, via reader 440, lugs 100 for sensor data from a distance without having to actually access each lug 100 directly. Wireless network access point 450 may include mechanisms for wireless communication with circuitry 110 of lug 100 and/or with wireless reader 440.

The configuration of network components of network environment 400 illustrated in FIG. 4A is for illustrative purposes. Other configurations may be implemented. Therefore, network environment 400 may include additional, fewer and/or different components that may be configured in a different arrangement than those depicted in FIG. 4A.

FIG. 4B depicts lugs 100-1 through 100-n transmitting respective sensor reports 470-1 through 470-n. As shown, lugs 100-1 through 100-p may transmit respective sensor reports 470-1 through 470-p to wireless reader 440, and lugs 100-p+1 through 100-n transmit respective sensor reports 470-p+1 through 470-n to wireless network access point 450. Wireless reader 440 may, in turn, forward reports 470-1 through 470-*p* to server 420 via network 410. Wireless network access point 450 may, in turn, forward reports 470-*p*+1 through 470-*n* to server 420 via network 410. Server 420 may extract data from the received sensor reports, and may analyze the data, possibly in combination with data stored in DB 430, to produce an analysis report 480. Server 420 may additionally forward the extracted data to DB 430 for storage.

Figure 5:
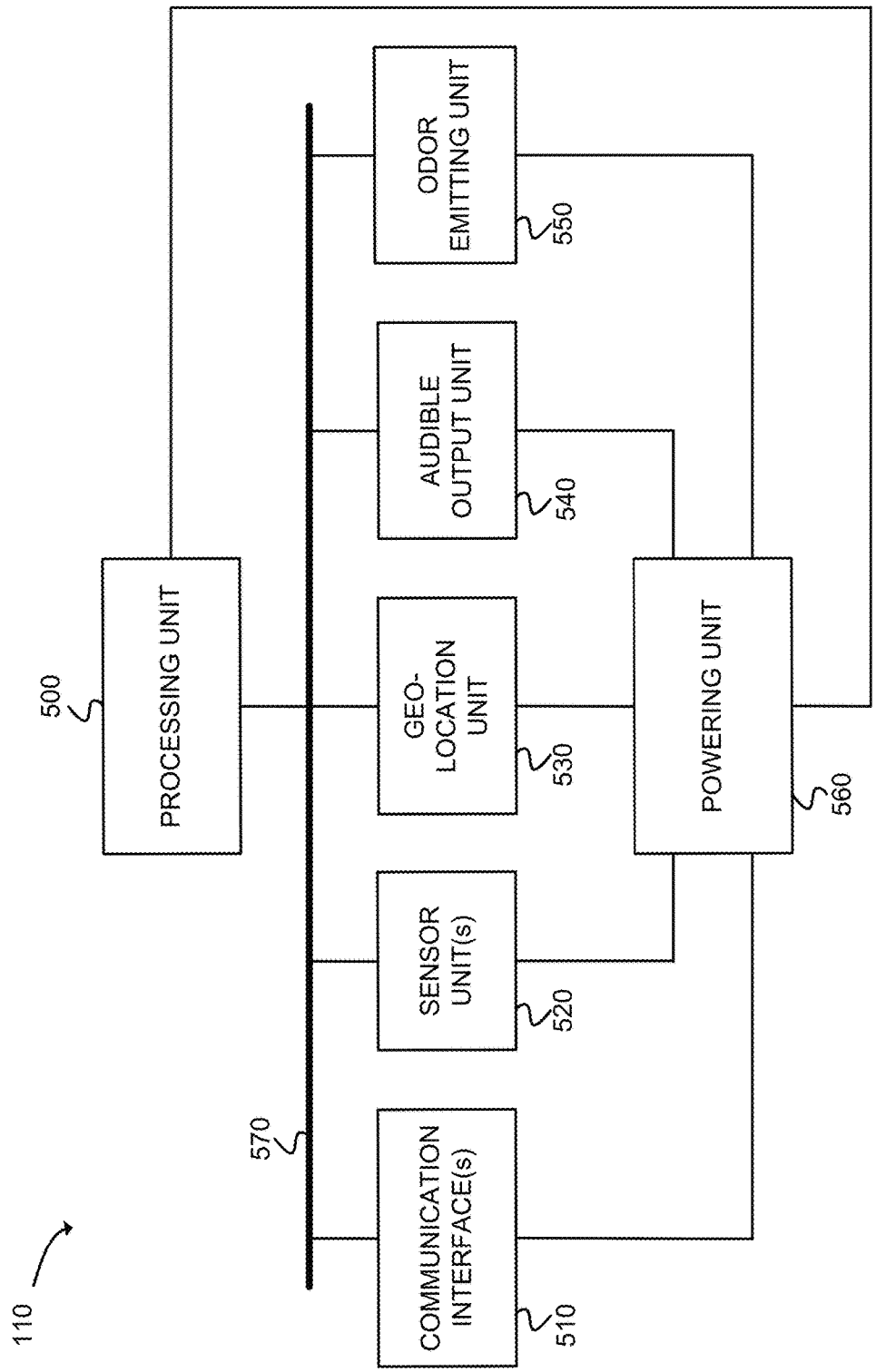
FIG. 5 is a diagram that depicts exemplary components of the circuitry of FIG. 2.

FIG. 5 is a diagram that depicts exemplary components of circuitry 110. Circuitry 110 may include a processing unit 500, one or more communication interfaces 510, one or more sensor units 520, a geo-location unit 530, an audible output unit 540, an odor emitting unit 550, a powering unit 560 and a bus 570.

Processing unit 500 may include one or more processors or microprocessors, or processing logic, which may interpret and execute instructions to perform processes, such as the process described below with respect to FIG. 8. Communication interface(s) 510 may include one or more active, semi-passive or passive (e.g., RFID) transmitters or transceivers that enable circuitry 110 of lug 100 to communicate with external devices and/or systems. The one or more transmitters or transceivers of communication interface(s) 510 may include wireless mechanisms for transmitting sensor reports and data to wireless reader(s) 440, or to server 420 via a wireless network access point(s) 450. Communication interface(s) 510 may include mechanisms for radio-frequency (RF) or optical communication (e.g., Wi-Fi, BlueTooth, cellular, or RFID circuitry).

Sensor unit(s) 520 may include one or more sensors, and associated circuitry, for sensing one or more environmental parameters, such as, for example, temperature, moisture, vibration, heat, impact force, compression force, velocity, and/or acceleration experienced at lug 100. If sensor unit(s) 520 includes a temperature sensor, the temperature sensor may include, for example, a thermocouple. Geo-location unit 530 may include circuitry for determining a geo-location of lug 100. In one implementation geo-location unit 530 may include a Global Positioning System (GPS) module that determines a geo-location of lug 100 based on received GPS satellite data.

Audible output unit 540 may include an audio unit that converts electrical signals into an audible output. Audible output unit 540 may, for example, provide notification signals (e.g., beeps or whistles) under certain conditions or circumstances. Odor emitting unit 550 may include an electronically controlled unit that emits certain stored chemicals that can, for example, be detected by people, animals (e.g., dogs), or electronic sniffing devices. Odor emitting unit 550 may, for example, emit the stored chemical(s) in gaseous form based on signals from processing unit 500.

Powering unit 560 may include circuitry for powering all, or most, of the components of circuitry 110. In one implementation, powering unit 560 may include circuitry for utilizing the temperature of lug 100 to generate power, or to "harvest" other "waste" energy associated with lug 100, or with its environment (e.g., with the object, structure, or item of equipment to which lug 100 is affixed). For example, powering unit 560 may include circuitry that uses the thermoelectric effect (i.e., Peltier effect) to generate a voltage based on a temperature difference across lug 100, or between lug 100 and another object, structure or item of equipment. Bus 570 may include an electrical path that permits communication among the components of circuitry 110.

The configuration of components of circuitry 110 shown in FIG. 5 is illustrative of a single exemplary implementation. Other configurations may be implemented. Therefore, circuitry 110 may include additional, fewer and/or different components, configured in a different arrangement, than those depicted in FIG. 5. For example, circuitry 110 may include one or more memory devices for storing data, and for storing instructions for use by processing unit 500. As another example, circuitry 110 may omit units 530, 540 and/or 550.

Figure 6:
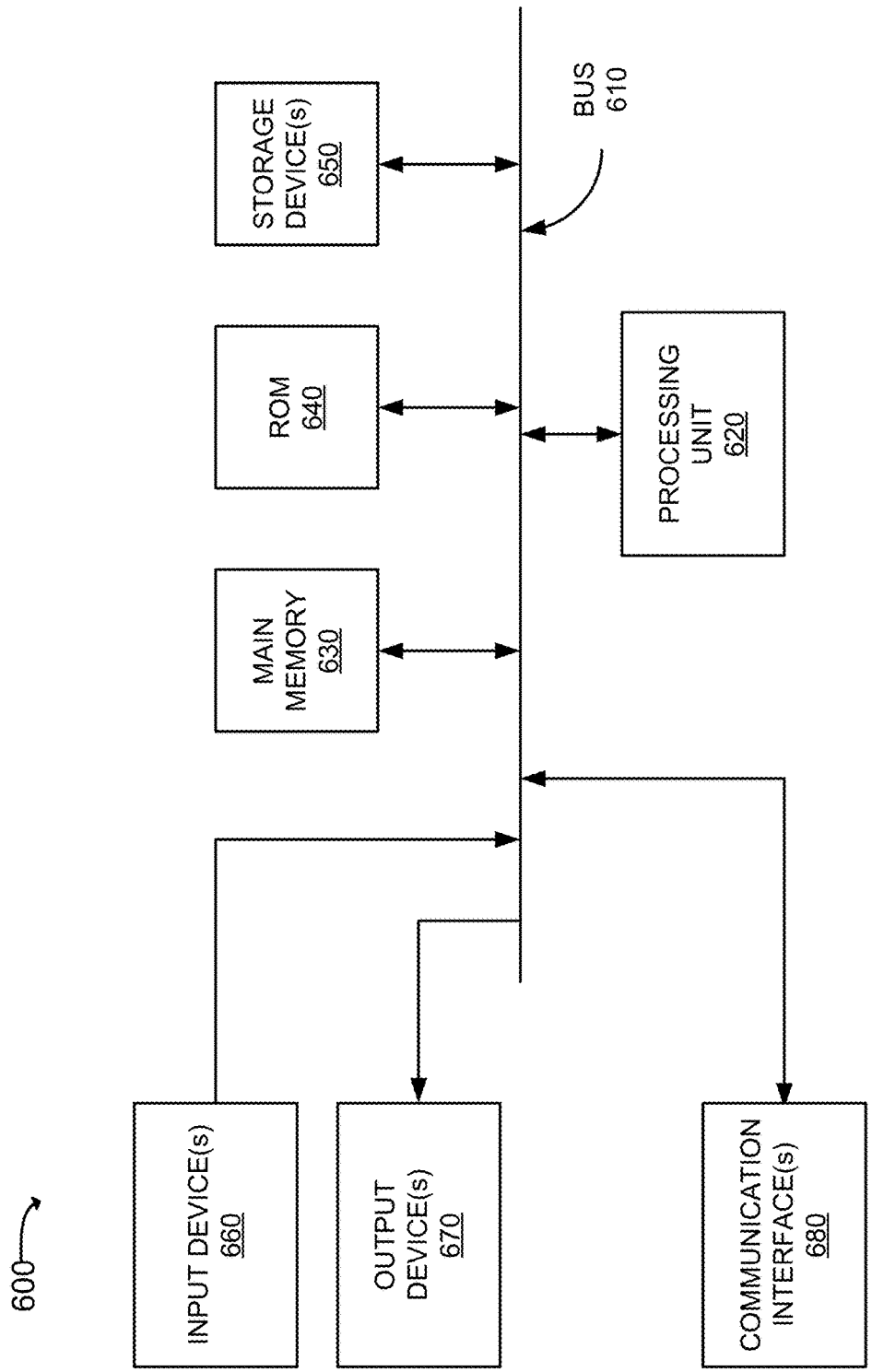
FIG. 6 is a diagram that depicts exemplary components of a device that may correspond to the server, database, wireless reader, and/or wireless network access point of FIG. 4A.

FIG. 6 is a diagram that depicts exemplary components of a device 600. Server 420, DB 430, wireless reader 440, and wireless network access point 450 may have the same, or similar, components and configuration of components as device 600 depicted in FIG. 6. Device 600 may include a bus 610, a processing unit 620, a main memory 630, a read only memory (ROM) 640, a storage device 650, an input device 660, an output device 670, and a communication interface 680. Bus 610 may include an electrical path that permits communication among the components of device 600.

Processing unit 620 may include one or more processors or microprocessors, or processing logic, which may interpret and execute instructions to perform processes, such as those described below with respect to FIGS. 9 and 10. Main memory 630 may include a random access memory (RAM) or another type of dynamic storage device that may store information and instructions for execution by processing unit 620. ROM 640 may include a ROM device or another type of static storage device that may store static information and instructions for use by processing unit 620. Storage device 650 may include a magnetic and/or optical recording medium. Main memory 630, ROM 640 and storage device 650 may each be referred to herein as a "tangible non-transitory computer-readable medium."

Input device 660 may include one or more mechanisms that permit a user/operator to input information to device 600, such as, for example, a keypad or a keyboard, a display with a touch sensitive panel, voice recognition and/or biometric mechanisms, etc. Output device 670 may include one or more mechanisms that output information to the user/operator, including a display, a speaker, etc. Input device 660 and output device 670 may, in some implementations, be implemented as a user interface (UI) that displays UI information and which receives user/operator input via the UI. Communication interface 680 may include one or more transceivers that enable device 600 to communicate with other devices and/or systems. For example, if device 600 is a wireless reader 440, communication interface 680 may include one or more wireless transmitters or transceivers for communicating with lugs 100, network 410, and/or wireless network access points 450. As another example, if device 600 is server 420, communication interface 680 may include mechanisms for communicating with network 410.

The configuration of components of device 600 shown in FIG. 6 is for illustrative purposes. Other configurations may be implemented. Therefore, device 600 may include additional, fewer and/or different components configured in a different arrangement than those depicted in FIG. 6. For example, if device 600 is a wireless reader 440, device 600 may additionally include a geo-location unit, such as, for example, a GPS unit that can obtain precise geo-location coordinates for a current location of wireless reader 440.

FIG. 7 depicts an exemplary data structure 700 that may be stored in monitoring and analysis DB 430. Data structure 700 may include multiple entries 710, each of which may include a lug ID field 720, a date/time field 730, a geo-location field 740, and sensor data fields 750-1 through 750-*q*. Each entry 710 stores data in fields 720-750 extracted from a single sensor report transmitted by circuitry 110 of a lug 100 identified by lug ID 720.

Lug ID field 720 may store a unique identifier associated with a lug 100 that transmitted the sensor report that included the data stored in fields 720-750. The unique identifier may also identify the attached equipment, object or structure, such as, for example, the motor or cable to which lug 100 is affixed. Date/time field 730 stores data that indicates a date and/or a time associated with the sensor report transmitted from a lug 100. Geo-location field 740 stores data that indicates a geo-location of lug 100 when lug 100 transmitted the sensor report that included the data stored in fields 720-750. Each of sensor data fields 750-1 through 750-*q* may store a respective environmental parameter sensed or measured by a sensor unit 520 of circuitry 110 of lug 100.

The number, types, and content of the entries and/or fields in data structure 700 in FIG. 7 are for illustrative purposes. Other types of data structures having different numbers of, types of and/or content of, the entries and/or the fields may be implemented. Therefore, data structure 700 may include additional, fewer and/or different entries and/or fields than those depicted in FIG. 7. An additional field, not shown in FIG. 7, may store data that uniquely identifies the equipment, object or structure to which lug 100 is affixed. For example, this additional field may uniquely identify a motor or cable to which lug 100 is affixed.

Figure 8:
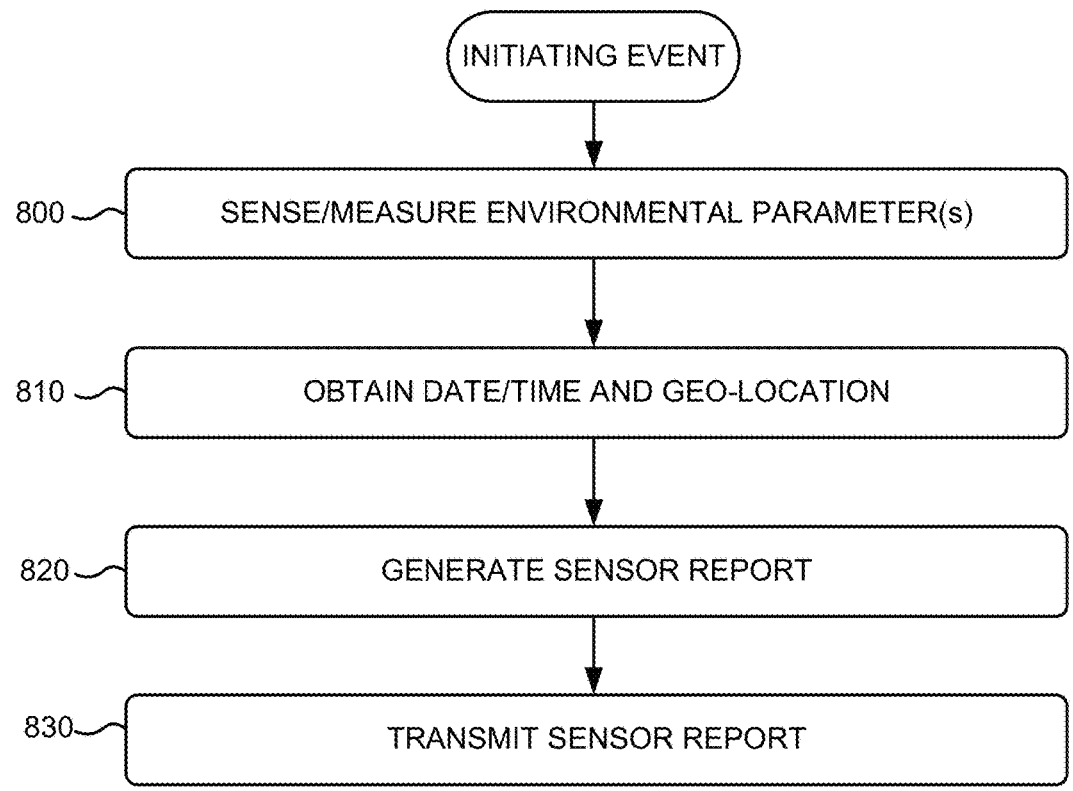
FIG. 8 is a flow diagram that illustrates an exemplary process for measuring environmental parameters at a lug.

FIG. 8 is a flow diagram that illustrates an exemplary process for measuring environmental parameters at a lug 100. The exemplary process of FIG. 8 may be performed by components of circuitry 110 of lug 100.

The exemplary process of FIG. 8 may be initiated by various initiating events. In one implementation, the initiating event may be a timer that initiates the process of FIG. 8 based on a designated schedule or a periodic interval. In another implementation, the initiating event may be the existence of adequate power stored in powering unit 560 of circuitry 110. In this implementation, powering unit 560 may utilize temperature, or other "waste" energy, to power the operation of the various components of circuitry 110 and when processing unit 500 determines that power unit 560 has an adequate stored supply of power, the exemplary process of FIG. 8 may be initiated to measure environmental parameters and to transmit the parameters from circuitry 110 of lug 100.

The exemplary process may include one or more sensor units 520 of circuitry 110 sensing or measuring environmental parameters associated with lug 100 (block 800). One or more sensor units 520 of circuitry 110 may sense temperature, vibration, moisture heat, impact force, compression force, velocity, and/or acceleration parameters associated with the environment of lug 100. Processing unit 500 may receive the sensed/measured parameters from sensor unit(s) 520.

Processing unit 500 of circuitry 110 may obtain a date and/or time associated with the measurement of the environmental parameters and may receive a geo-location from geo-location unit 530 (block 810). Processing unit 500 may maintain an internal calendar and clock that keeps track of a current date and time. Processing unit 500 may obtain a geo-location (e.g., latitude and longitude) of lug 100 from geo-location unit 530. Alternatively, processing unit 500 may retrieve a geo-location of lug 100 previously manually stored in a memory of circuitry 110. In some implementations, block 810 may be an optional block. In such an implementation, circuitry 110 may omit geo-location unit 530, and the date/time of the sensor report and the geo-location of lug 100 may be obtained by wireless reader 440 upon receiving a sensor report from circuitry 110 (as described below with respect to FIG. 9).

Processing unit 500 may generate a sensor report 120 using the measured environmental parameter(s), the date/time and/or the geo-location (block 820). Processing unit 500 may retrieve a lug ID from memory, and may obtain a lug signature. The lug signature may be obtained, for example, using a signature generating technique such as, for example, a hash function applied to the lug ID. Processing unit 500 may append the lug signature, lug ID, date/time, sensed environmental parameters and/or geo-location to sensor report 120. Circuitry 110 may transmit the sensor report 120 (block 830). Processing unit 500 may send the sensor report 120 to communication interface 510 which, in turn, transmits the the sensor report using wireless mechanisms.

Figure 9:
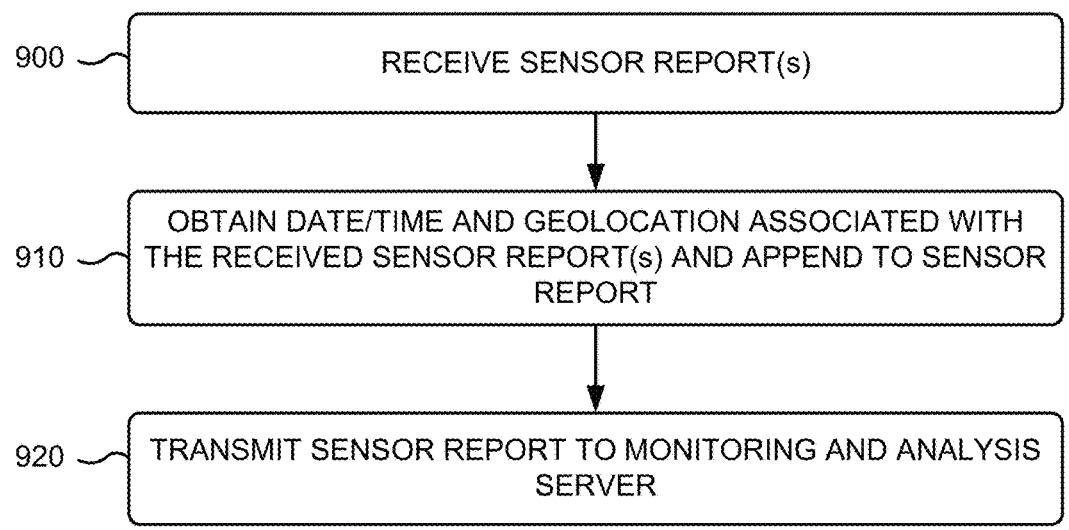
FIG. 9 is a flow diagram that illustrates an exemplary process receiving and forwarding sensor reports from a circuit of a lug.

FIG. 9 is a flow diagram that illustrates an exemplary process for receiving and forwarding sensor reports from circuitry 110 of lug 100. The exemplary process of FIG. 9 may be performed by wireless reader 440.

The exemplary process may include wireless reader 440 receiving a sensor report(s) transmitted from communication interface 510 of circuitry 110 of a lug 100 (block 900). Communication interface 680 of wireless reader 440 may receive wireless (e.g., Radio Frequency (RF) or optical) transmissions from circuitry 110 of lug 100. Wireless reader 440 may obtain a date and/or time and a geo-location associated with the received sensor report(s) and may append to the sensor report (block 910). Processing unit 620 may maintain an internal calendar and clock that keeps track of a current date and time. Processing unit 620 may obtain a geo-location (e.g., latitude and longitude) of lug 100 from a geo-location unit of wireless reader 440. Alternatively, processing unit 620 may retrieve a geo-location of lug 100 previously manually stored in a memory of wireless reader 440, where the lug ID of lug 100 maps to the stored geo-location. Wireless reader 440 may transmit the sensor report to monitoring and analysis server 420 (block 920). Communication interface 680 may transmit the sensor report via wireless mechanisms to a wireless network access point 450, network 410, and on to server 420. In other implementations, communication interface 680 of wireless reader 440 may be connected to network 410 via a wired connection.

Figure 10:
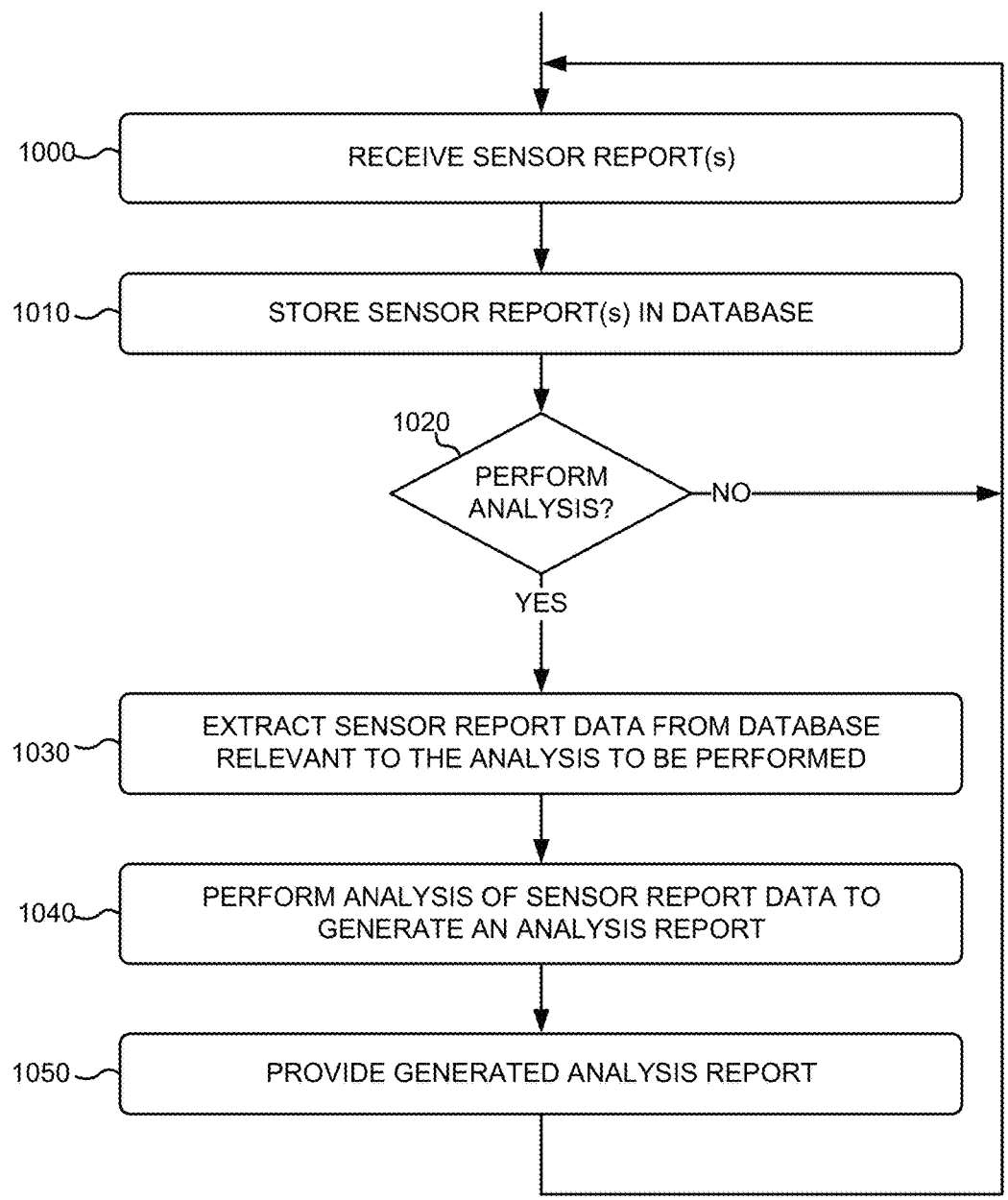
FIG. 10 is a flow diagram that illustrates an exemplary process for performing an analysis of sensor data transmitted from one or more lugs.

FIG. 10 is a flow diagram that illustrates an exemplary process for performing an analysis of sensor data transmitted from one or more lugs 100. The exemplary process of FIG. 10 may be performed by monitoring and analysis server 420.

The exemplary process may include server 420 receiving one or more sensor reports (block 1000). Server 420 may receive the one or more sensor reports from a lug 100 via a wireless network access point 450 and/or wireless reader 440 and network 410. Server 420 may extract the data from the sensor report(s) and store the data in appropriate fields of DB 430 (block 1010). Server 420 may extract the lug ID and date/time from the sensor report and store the lug ID in lug ID field 720 and the date/time in date/time field 730 of an entry 710 of data structure 700. Server 420 may further extract the geo-location from the sensor report and store in geo-location field 740 of the entry 710 of data structure 700. Server 420 may additionally extract one or more measured environmental parameters from the sensor report and store the parameters in appropriate ones of sensor data fields 750-1 through 750-*q*. Server 420 may additionally verify the authenticity of the extracted lug signature, such as, for example, performing a hash on the lug signature.

Server 420 may determine whether an analysis of data from the sensor reports should be performed (block 1020). A particular analysis may be performed on-demand, or at periodic or scheduled times. The particular analyses available for use by server 420 may be provided by an operator of server 420, who may additionally select the periodic or scheduled times of the analysis, or whether to perform a selected analysis algorithm on-demand.

If no analysis is to be currently performed (NO—block 1020), then the exemplary process may return to block 1000 with the receipt of an additional sensor report(s). Blocks 1000, 1010 and 1020 may be repeated numerous times to receive multiple sensor reports from multiple different lugs 100. If an analysis is to be performed (YES—block 1020), then server 420 may extract sensor report data from DB 430 that is relevant to the analysis to be performed (block 1030). Server 420 may store algorithms for one or more different data analyses, each of which analyzes one or more particular types of data extracted from sensor reports. Server 420 may perform the analysis of the sensor report data to generate an analysis report (block 1040) and may provide the generated analysis report (block 1050). Server 420 may execute the selected analysis algorithm to analyze the data extracted from DB 430, and may generate a report that may, for example, include plots (e.g., 2-D or 3-D). Server 420 may provide the report in electronic or hard-copy format. An analysis report may, for example, indicate that vibration associated with a motor is higher than an expected range, or that temperature of the motor is higher or lower than an expected range. The analysis report may identify any deviations from nominal for measured parameters such as temperature, moisture, vibration, heat, impact force, compression force, velocity, acceleration, and/or other environmental parameters. Additionally, or alternatively, the analysis report may plot measured parameters as a function of time, or versus one another (e.g., in a multi-dimensional plot). Subsequent to block 1050, the exemplary process may return to block 1000 with the receipt of one or more additional sensor reports.

Figure 11:
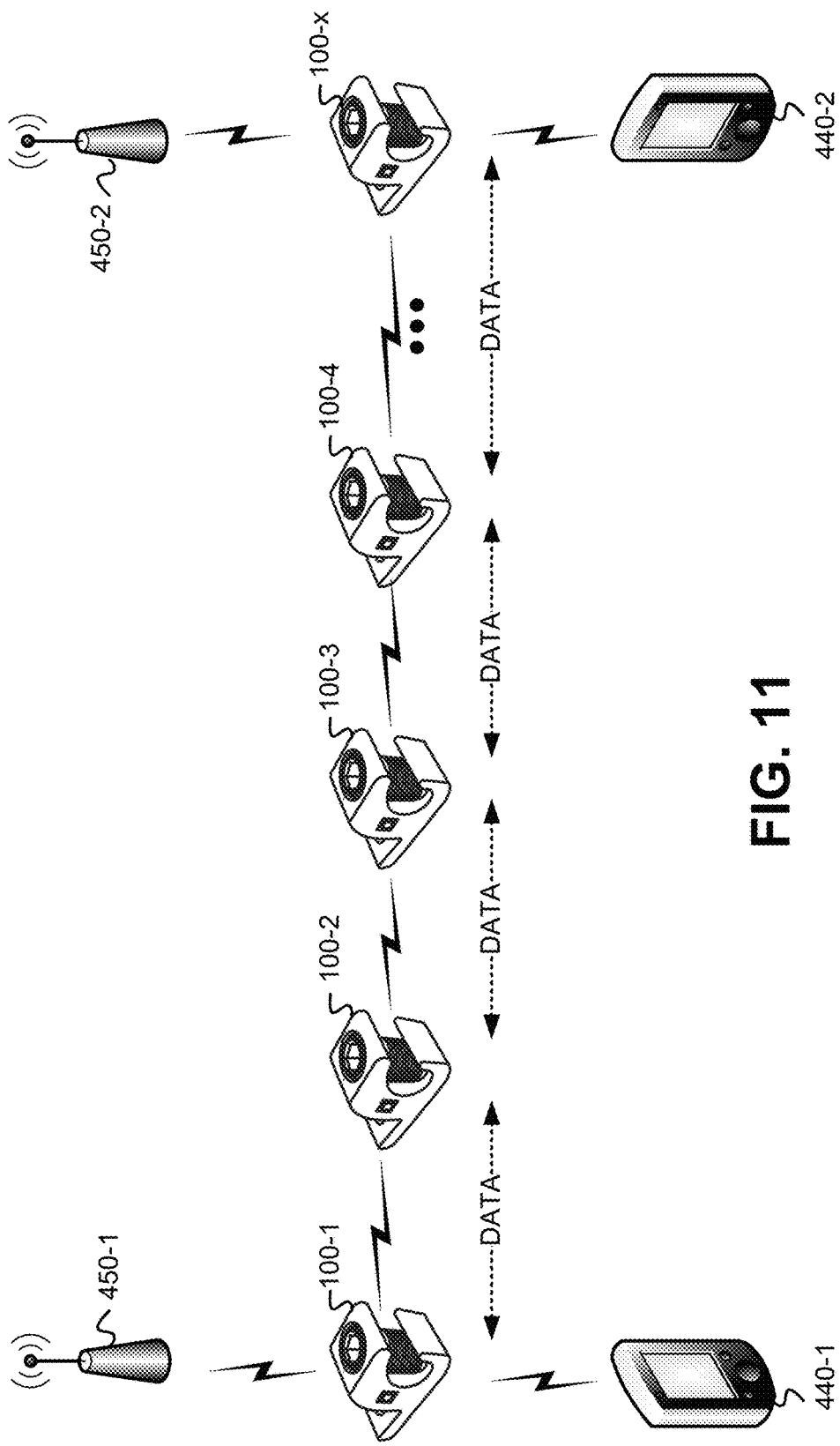
FIG. 11 depicts an exemplary embodiment in which each lug in a series of lugs may act as a repeating relay that relays sensor reports, or other data, transmitted from other lugs in the series of lugs.

FIG. 11 depicts an exemplary embodiment in which each lug in a series of lugs 100-1 through 100-*x* may act as a repeating relay that relays sensor reports, or other data, transmitted from other lugs in the series of lugs. As shown in FIG. 11, lugs 100-1 and 100-2 may communicate with one another, lugs 100-2 and 100-3 may communicate with one another, lugs 100-3 and 100-4 may communicate with one another, and lugs 100-4 and 100-*x* may communicate with one another. In the example depicted in FIG. 11, sensor reports, or other data, may be relayed along the series of lugs to reach either lug 100-1 or 100-*x*, which may each connect to a respective wireless network access point 450-1 and 450-2 via a wireless link. Wireless network access points 450-1 and 450-2 may each further connect to network 410 (not shown). Alternatively, wireless readers 440-1 and 440-2 may be used to receive sensor reports, or other data, transmitted from lugs 100-1 and 100-*x*.

In one example of the series relaying of FIG. 11, lug 100-3 may generate a sensor report and may transmit the sensor report to lug 100-4. In turn, lug 100-4 may forward the sensor report to lug 100-*x* which transmits the sensor report to wireless network access point 450-2 or wireless reader 440-2. In another example of the series relaying of FIG. 11, lug 100-2 may generate a sensor report and may transmit the sensor report to lug 100-1. In turn, lug 100-1 may transmit the sensor report to wireless network access point 450-1 or wireless reader 440-1. In yet another example of the series relaying of FIG. 11, lug 100-1 may determine that there is no wireless reader 440-1 and/or that the wireless link to wireless network access point 450-1 has failed. Based on this determination, lug 100-1 may generate a sensor report and may transmit the sensor report to lug 100-2. Lugs 100-2, 100-3 and 100-4, in turn, relay the sensor report to lug 100-*x*. Lug 100-*x* then transmits the relayed sensor report to wireless network access point 450-2 or wireless reader 440-2. In one implementation in which the lugs are electrical connectors, the successive relaying of sensor reports from connector-to-connector may permit each connector in the series to determine a resistive difference value between that connector and another connector. A determination of resistive difference values at each connector may further enable the determination of a location of a failure (i.e., broken connection) along an electrical cable connected to the series of connectors.

FIG. 11 depicts a series of similar lugs relaying data between one another. In other implementations, dissimilar items (not shown) having wireless communication capability may relay data between one another. For example, a lug 100 may communicate with another lug, which communicates with a cable, which further communicates with a tool die, which also communicates with a connector.

Figure 12:
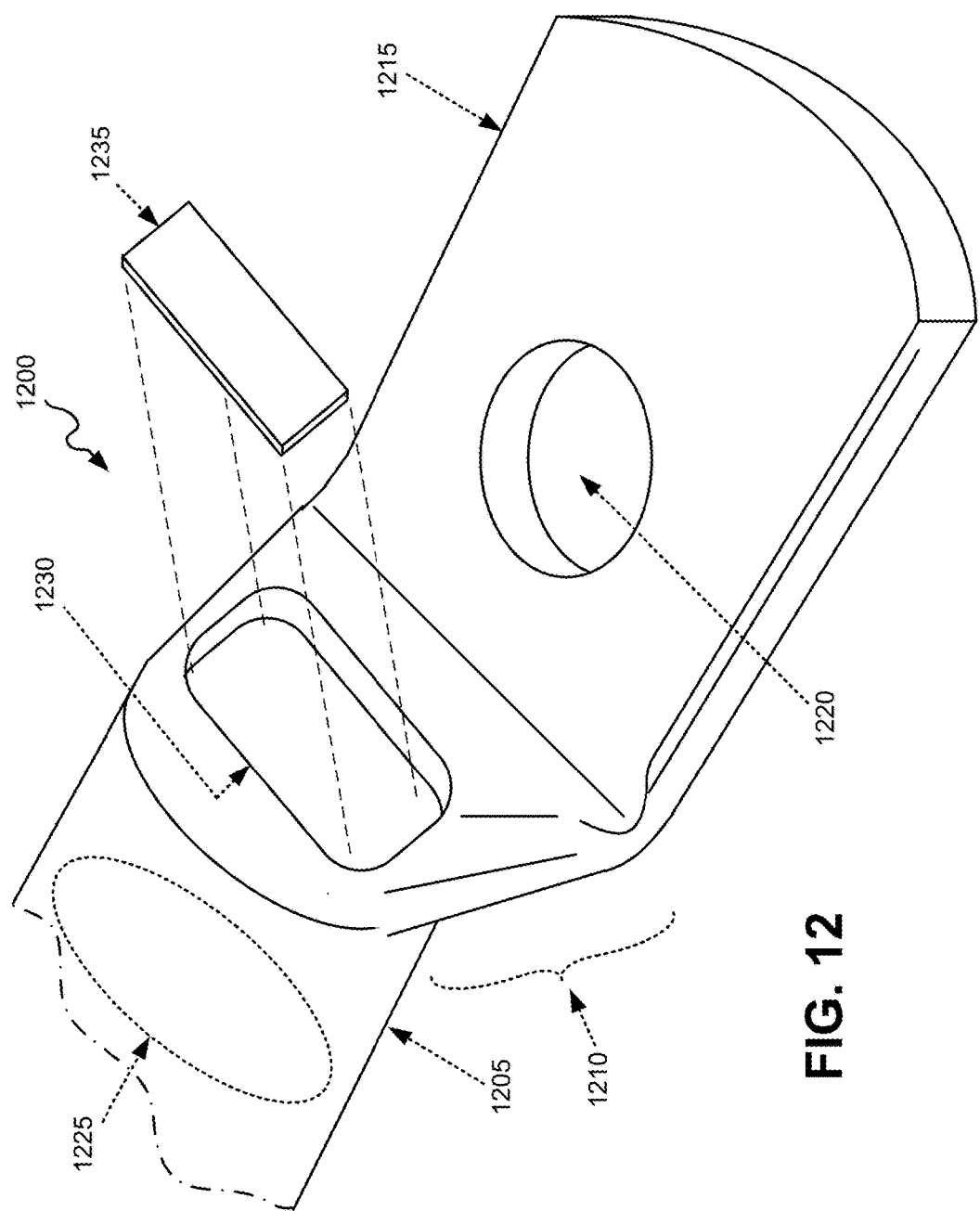
FIGS. 12 and 13 depict an exemplary embodiment of a wire connector lug that includes wireless communication circuitry affixed to the lug using a color coded sealing layer.
Figure 13:
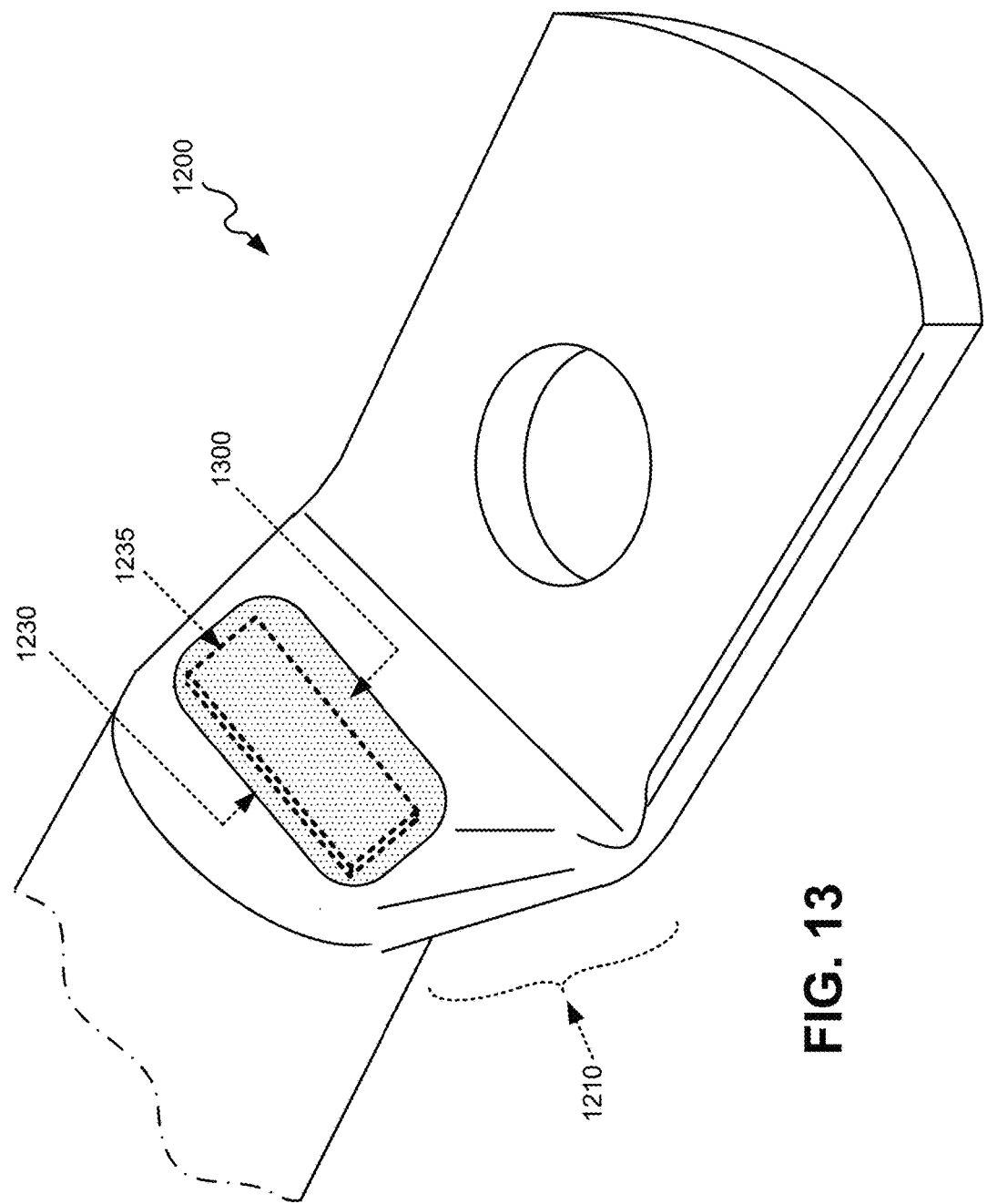

FIGS. 12 and 13 depict an exemplary embodiment of a wire connector lug 1200 that includes wireless communication circuitry affixed to the lug using a color coded sealing layer. As shown in FIG. 12, wire connector lug 1200 may include a barrel 1205, a neck 1210, a pad 1215 with an attachment hole 1220, and a recess 1230. Barrel 1205 may include a hollow inner diameter 1225 for receiving wires that may be affixed to lug 1200 by, for example, crimping barrel 1205. Pad 1215 may have a certain length and width that may depend upon the particular application for which wire connector lug 1200 is to be used. A bolt or screw (not shown) may be inserted through attachment hole 1220 to affix wire connector lug 1200 to a surface, structure, or other device (e.g., a motor). Recess 1230 may be formed in neck 1210 of lug 1200, and may have a depth sufficient to fit wireless communication circuitry 1235 within recess 1230. Wireless communication circuitry 1235 may be the same, or similar to, the circuitry 110 described above with respect to FIGS. 1-3. For example, circuitry 1235 may include one or more communication interface units, one or more sensor units, a processing unit (e.g., a microprocessor), and/or a powering unit.

FIG. 13 further depicts circuitry 1235 inserted into recess 1230, and a sealing layer 1300 formed over circuitry 1235 within recess 1230. Sealing layer 1300 may be formed within recess 1230 to fill the entirety of recess 1230 and to completely cover circuitry 1235 and seal circuitry 1235 within recess 1230. Sealing layer 1300 may ensure that circuitry 1235 is mechanically affixed to lug 1200 within recess 1230, and may also protect circuitry 1235 from the external environment (i.e., water resistant). In some implementations, sealing layer 1300 may include an acrylic, a polyurethane, an epoxy, or a silicon layer. A color of sealing layer 1300 may be coded to indicate a gauge of the wire inserted into barrel 1205 of wire connector lug 1200. For example, a lug 1200 used with a wire of gauge 20 AWG may have a sealing layer 1300 of a first color, as compared to lug 1200 used with a wire of gauge 14 AWG which may have a sealing layer 1300 of a second color that is different than the first color and which is specific to wires of gauge 14 AWG. Sealing layer 1300 may, therefore, be composed of multiple different colors, such as, for example, multi-colored epoxy. Color coding of sealing layer 1300 permits easy inspection and determination of the gauge of the wire inserted into wire connector lug 1200. In other implementations, sealing layer 1300 may be color coded for other purposes. For example, sealing layer 1300 may be color coded to indicate a different version or type of circuitry 1235 sealed in recess 1230. Alternatively, sealing layer 1300 may be color coded to indicate type of wireless communication available for use by circuitry 1235. For example, one color of sealing layer 1300 may indicate that circuitry 1235 includes passive RFID circuitry. In another example, a second color of sealing layer 1300 may indicate that circuitry 1235 includes BlueTooth circuitry.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 8, 9 and 10 the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A device, comprising:
    a device body comprising:
        a recess formed in an outer surface of the body, the recess having a depth that extends to a bottom of the recess;
        a first attachment mechanism disposed at a first location on the body for attaching to a first object, structure, or item of equipment; and
        a second attachment mechanism disposed at a second location on the body for attaching to a second object, structure, or item of the equipment, wherein the second object, structure, or item of equipment is different than the first object, structure, or item of equipment;
    an insulating layer affixed to the body in the bottom of the recess;
    wireless communication circuitry affixed to the device body in the bottom of the recess via the insulating layer; and
    one or more sensor components affixed to the device body in the bottom of the recess via the insulating layer, coupled to the wireless communication circuitry, and configured to sense environmental parameters associated with the device or with the second object, structure, or item of equipment.

2. The device of claim 1, further comprising:
    a sealant layer formed over the wireless communication circuitry, and the one or more sensor components, within the recess.

3. The device of claim 2, wherein the other object comprises a wire and wherein a color of the sealant layer is color-coded based on a gauge of the wire to which the device body is to be attached.

4. The device of claim 1, further comprising:
    powering circuitry, affixed to the device body, and configured to provide electrical power to at least one of the wireless communication circuitry or the one or more sensor components.

5. The device of claim 1, wherein the other object, structure, or item of equipment comprises a motor or a cable.

6. The device of claim 1, wherein the device comprises a lug, and wherein the body includes a cut-out into which the first object, structure, or item of the equipment can be inserted,
    wherein the first attachment mechanism comprises an attachment screw that can be tightened within the cut-out against the first object, structure, or item of the equipment to press the first object, structure, or item of the equipment against an opposite surface of the cut-out to affix the body of the lug to the inserted first object, structure, or item of the equipment, and
    wherein the second attachment mechanism comprises an attachment hole through which a bolt or screw of other attaching means can be inserted to affix the body to the second object, structure, or item of the equipment.

7. The device of claim 1, wherein the wireless communication circuitry is configured to wirelessly communicate with an external wireless network access point connected to a network.

8. The device of claim 1, wherein the device comprises a lug and wherein the first object, structure, or item of the equipment comprises a wire,
    wherein the body comprises a barrel, a neck, and a pad and wherein the barrel comprises the first attachment mechanism,
    wherein the barrel includes a hollow inner diameter for receiving the wire to be affixed to the lug and wherein the pad has a length and a with and an attachment hole through which a bolt or screw of another attaching means can be inserted to affix the body to the second object, structure, or item of the equipment, and wherein the attachment hole comprises the second attachment mechanism, and
    wherein the recess is disposed within the neck of the body of the lug.

9. The device of claim 1, wherein the environmental parameters sensed by the one or more sensor components comprise at least one of:
    temperature, moisture, vibration, heat, impact force, compression force, velocity, or acceleration associated with the device or with the second object, structure or item of equipment.

10. The device of claim 4, wherein the powering circuitry is configured to harvest waste energy from the device body; from the wireless communication circuitry, one or more sensor components, or the powering circuitry; or from the first object, structure, or item of equipment.

11. The device of claim 10, wherein the powering circuitry is configured to use a thermoelectric effect to generate a voltage to provide electrical power to the wireless communication circuitry and the one or more sensor components based on a temperature difference across the device body, or between the device and the second object, structure, or item of equipment.

12. The device of claim 6, wherein the first object, structure, or item of the equipment comprises a cable, and
wherein the cut-out comprises a C-shaped cut-out into which the cable can be inserted and wherein the attachment screw can be tightened against the cable to affix the body of the lug to the inserted cable.

13. The device of claim 1, further comprising:
an odor emitting unit configured to emit one or more stored chemicals in a gaseous form.

14. The device of claim 1, further comprising:
a processing unit configured to generate a sensor report using the sensed environmental parameters,
wherein the wireless communication circuitry is configured to transmit the sensor report via a wireless mechanism.

15. The device of claim 14, wherein the wireless mechanism comprises Wi-Fi, BlueTooth, cellular or Radio Frequency Identification (RFID) communication circuitry.

16. The device of claim 14, further comprising:
a geo-location unit configured to obtain a geo-location of the device,
wherein the processing is further configured to generate the sensor report using the obtained geo-location of the device.

17. The device of claim 14, wherein the processing unit is further configured to:
obtain an identifier for the device,
generate a signature based on the identifier,
obtain a current date and time, and
generate the sensor report using the identifier, the signature, and the current date and time.

18. A lug, comprising:
a body, comprising:
a C-shaped cut-out formed in the body into which a first object can be inserted,
a recess formed in the body,
a first attachment mechanism disposed at a first location on the body adjacent the C-shaped cut-out for attaching to the first object, wherein the first attachment mechanism comprises an attachment screw that can be tightened within the C-shaped cut-out, against the first object to press the first object against an opposite surface of the C-shaped cut-out, to affix the body of the lug to the inserted first object, and
a second attachment mechanism disposed at a second location on the body for attaching to a second object, wherein the second attachment mechanism comprises an attachment hole through which a bolt, screw or other attaching means can be inserted to affix the body to the second object;
an insulating layer affixed to the body within a bottom of the recess;
wireless communication circuitry affixed to the body within the recess via the insulating layer;
one or more sensor components affixed to the body within the recess via the insulating layer, coupled to the wireless communication circuitry, and configured to sense environmental parameters associated with the lug, or with the second object; and
a sealing layer formed over the wireless communication circuitry, and the one or more sensor components, within the recess of the body of the lug.

19. The lug of claim 18, wherein the first object comprises a cable and wherein the second object comprises a motor.

20. The lug of claim 18, wherein the sealing layer comprises an acrylic, polyurethane, epoxy or silicon layer.

21. The lug of claim 18, wherein the environmental parameters sensed by the one or more sensor components comprise at least one of:
temperature, moisture, vibration, heat, impact force, compression force, velocity, or acceleration associated with the lug or with the second object.

22. The lug of claim 18, further comprising:
powering circuitry, affixed to the body, and configured to provide electrical power to at least one of the wireless communication circuitry or the one or more sensor components,
wherein the powering circuitry is configured to harvest waste energy from the body of the lug; from the wireless communication circuitry, the one or more sensor components, or the powering circuitry; or from the second object.

23. A wire connector lug, comprising:
a body, comprising:
a barrel that includes a hollow inner diameter for receiving a wire to be affixed to the wire connector lug,
a neck connected to the barrel, a pad connected to the neck, wherein the pad has a length and width and an attachment hole through which a bolt, screw or other attaching means can be inserted to affix the body to an object, structure, or item of equipment, and
a recess disposed within an outer surface of the neck of the body of the wire connector lug, the recess having a depth that extends to a bottom of the recess; an insulating layer affixed to the body within the bottom of the recess;
wireless communication circuitry affixed to the body within the recess via the insulating layer;
one or more sensor components affixed to the body within the recess via the insulating layer, coupled to the wireless communication circuitry, and configured to sense environmental parameters associated with the wire connector lug, or with the object, structure, or item of equipment; and
a sealing layer formed over the wireless communication circuitry, and the one or more sensor components, within the recess of the body of the wire connector lug.

24. The wire connector lug of claim 23, wherein a color of the sealing layer is color-coded based on a gauge of the wire to which the body is to be attached.

25. The wire connector lug of claim 23, wherein the sealing layer comprises an acrylic, polyurethane, epoxy or silicon layer.

26. The wire connector lug of claim 23, wherein the barrel comprises a crimping barrel for crimping to the wire and wherein the object, structure, or item of equipment comprises a motor.

* * * * *